US009805708B2

(12) United States Patent
Kim

(10) Patent No.: US 9,805,708 B2
(45) Date of Patent: Oct. 31, 2017

(54) SOUND ABSORBING AND INSULATING MATERIAL WITH SUPERIOR MOLDABILITY AND APPEARANCE AND METHOD FOR MANUFACTURING THE SAME

(71) Applicant: Hyundai Motor Company, Seoul (KR)

(72) Inventor: Keun Young Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/105,920

(22) PCT Filed: Apr. 3, 2014

(86) PCT No.: PCT/KR2014/002863
§ 371 (c)(1),
(2) Date: Jun. 17, 2016

(87) PCT Pub. No.: WO2015/093689
PCT Pub. Date: Jun. 25, 2015

(65) Prior Publication Data
US 2016/0322041 A1 Nov. 3, 2016

(30) Foreign Application Priority Data

Dec. 19, 2013 (KR) .................. 10-2013-0159410

(51) Int. Cl.
*E04B 2/02* (2006.01)
*G10K 11/168* (2006.01)
(Continued)

(52) U.S. Cl.
CPC ............. *G10K 11/168* (2013.01); *B32B 1/00* (2013.01); *B32B 5/022* (2013.01); *B32B 5/26* (2013.01);
(Continued)

(58) Field of Classification Search
CPC .. G10K 11/162; G10K 11/168; E04B 1/8409; E04B 2/02; E04B 2001/8461; E04B 2001/8466; E04B 2001/8471
(Continued)

(56) References Cited

U.S. PATENT DOCUMENTS 5,923,002 A * 7/1999 McGrath .................. B32B 5/26
181/290
8,278,228 B2 10/2012 Kaneda
(Continued)

FOREIGN PATENT DOCUMENTS

CN  1842698 A  10/2006
CN  101189380 A  5/2008
(Continued)

OTHER PUBLICATIONS

International Search Report—PCT/KR2014/002863, dated May 21, 2014.
(Continued)

Primary Examiner — Forrest M Phillips
(74) Attorney, Agent, or Firm — Mintz Levin Cohn Ferris Glovsky and Popeo, P.C.; Peter F. Corless

(57) ABSTRACT

The present invention relates to a sound absorbing and insulating material with superior moldability and appearance and a method for manufacturing the same, more particularly to a sound absorbing and insulating material consisting of an inner sound absorbing and insulating layer 1 formed of a first nonwoven fabric mainly formed of a heat-resistant fiber and a binder uniformly distributed inside the first nonwoven fabric and maintaining the three-dimensional structure inside the first nonwoven fabric and an outer sound absorbing and insulating layer 2', 2" formed of a second nonwoven fabric mainly formed of a heat-resistant fiber, wherein the outer sound absorbing and insulating layer (Continued)

is stacked on one or both sides of the inner sound absorbing and insulating layer, and a method for manufacturing the same. The sound absorbing and insulating material of the present invention has superior sound-absorbing property, flame retardancy, heat resistance, heat-insulating property and high-temperature moldability. In addition, there is no concern of deterioration of surface appearance caused by leakage of the binder due to the presence of the outer sound absorbing and insulating layer.

40 Claims, 6 Drawing Sheets

(51) Int. Cl.
*B32B 5/26* (2006.01)
*B32B 7/12* (2006.01)
*B32B 5/02* (2006.01)
*B32B 38/12* (2006.01)
*D04H 1/4374* (2012.01)
*B32B 37/06* (2006.01)
*B32B 37/10* (2006.01)
*B32B 37/12* (2006.01)
*B32B 37/14* (2006.01)
*B60R 13/08* (2006.01)
*B32B 1/00* (2006.01)
*F16L 59/02* (2006.01)

(52) U.S. Cl.
CPC ............... *B32B 7/12* (2013.01); *B32B 37/06* (2013.01); *B32B 37/10* (2013.01); *B32B 37/12* (2013.01); *B32B 37/14* (2013.01); *B32B 38/12* (2013.01); *B60R 13/08* (2013.01); *D04H 1/4374* (2013.01); *F16L 59/02* (2013.01); *B32B 2250/20* (2013.01); *B32B 2250/40* (2013.01); *B32B 2260/021* (2013.01); *B32B 2260/023* (2013.01); *B32B 2260/046* (2013.01); *B32B 2262/0269* (2013.01); *B32B 2262/0276* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2305/20* (2013.01); *B32B 2307/102* (2013.01); *B32B 2307/304* (2013.01); *B32B 2307/3065* (2013.01); *B32B 2307/718* (2013.01); *B32B 2307/738* (2013.01); *B32B 2605/00* (2013.01)

(58) Field of Classification Search
USPC .......................................................... 181/290
See application file for complete search history.

(56) References Cited

U.S. PATENT DOCUMENTS

| | | | | |
|---|---|---|---|---|
| 8,387,748 | B2* | 3/2013 | Richardson, III | ........ B32B 5/18 |
| | | | | 181/284 |
| 8,770,169 | B2* | 7/2014 | Koyama | ................. F02B 77/13 |
| | | | | 123/195 C |
| 2009/0117806 | A1 | 5/2009 | Kaneda | |
| 2011/0139542 | A1* | 6/2011 | Borroni | ................... B32B 3/266 |
| | | | | 181/290 |
| 2011/0253474 | A1* | 10/2011 | Castagnetti | ......... B60R 13/0815 |
| | | | | 181/290 |

FOREIGN PATENT DOCUMENTS

| | | | | |
|---|---|---|---|---|
| EP | 1733827 | A1 | 12/2006 | |
| JP | 3083182 | B2 | 9/2000 | |
| JP | 2005-335279 | | * 12/2005 | ............... B32B 5/26 |
| JP | 2005-335279 | A | 12/2005 | |
| JP | 2007-039826 | A | 2/2007 | |
| JP | 2007-138953 | A | 6/2007 | |
| JP | 2008-026517 | A | 2/2008 | |
| JP | 2009-078446 | A | 4/2009 | |
| JP | 2013-139188 | A | 7/2013 | |
| KR | 10-2006-0003276 | | 1/2006 | |
| KR | 10-2006-0111330 | A | 10/2006 | |
| KR | 2006-0111330 | | 10/2006 | |
| KR | 2007-0033310 | | 3/2007 | |
| KR | 10-2008-0017302 | | 2/2008 | |
| WO | 2013/127368 | A1 | 9/2013 | |

OTHER PUBLICATIONS

International Preliminary Report on Patentability for International Application No. PCT/KR2014/002863 dated Jun. 21, 2016, and Written Opinion, 13 pages.

* cited by examiner

SOUND ABSORBING AND INSULATING MATERIAL WITH SUPERIOR MOLDABILITY AND APPEARANCE AND METHOD FOR MANUFACTURING THE SAME

CROSS-REFERENCE TO RELATED APPLICATIONS

This application claims the benefit of International Application No. PCT/KR2014/002863, filed Apr. 3, 2014, which also claims under 35 U.S.C. §119, the priority of Korean Patent Application No. 10-2013-0159410, filed on Dec. 19, 2013, in the Korean Intellectual Property Office, the disclosure of which is incorporated herein by reference in its entirety.

BACKGROUND (a) Technical Field

The present invention relates to a sound absorbing and insulating material with superior moldability and appearance and a method for manufacturing the same, more particularly to a sound absorbing and insulating material consisting of an inner sound absorbing and insulating layer 1 formed of a first nonwoven fabric mainly formed of a heat-resistant fiber and a binder uniformly distributed inside the first nonwoven fabric and maintaining the three-dimensional structure inside the first nonwoven fabric and an outer sound absorbing and insulating layer 2', 2" formed of a second nonwoven fabric mainly formed of a heat-resistant fiber, wherein the outer sound absorbing and insulating layer is stacked on one or both sides of the inner sound absorbing and insulating layer, and a method for manufacturing the same. The sound absorbing and insulating material of the present invention has superior sound-absorbing property, flame retardancy, heat resistance, heat-insulating property and high-temperature moldability. In addition, there is no concern of deterioration of surface appearance caused by leakage of the binder due to the presence of the outer sound absorbing and insulating layer.

(b) Background Art

Noise, as an unwanted side effect of industrial development, causes gradually more damages. A variety of measures are taken to prevent noise. As a way of such noise prevention, researches for developing new sound absorbing and insulating materials capable of arresting, absorbing or insulating sound are conducted in various ways.

Representative industrial sectors requiring sound absorbing and insulating materials include electric appliances such as an air conditioner, a refrigerator, a washing machine, a lawn mower and the like, transportation such as an automobile, a ship, an airplane and the like, construction materials such as a wall material, a flooring material and the like, and so forth. The sound absorbing and insulating material is required in other various industrial fields, too. In general, the sound absorbing and insulating materials used in industries require, in addition to good sound-absorbing property, reduced weight, flame retardancy, heat resistance and heat-insulating property, depending on particular applications. Especially, flame retardancy and heat resistance may be further required for sound absorbing and insulating materials used in engines, exhaust systems and the like maintained at high temperatures of 200° C. or above. At present, an aramid fiber is gaining attentions for sound absorbing and insulating materials having superior heat resistance.

In addition, in order to provide functionalities such as flame retardancy, water repellency and the like to a sound absorbing and insulating material, many sound absorbing materials wherein a nonwoven fabric containing aramid fibers and a functional skin material are stacked have been developed.

For example, Korean Patent Publication No. 2007-0033310 discloses a flame-retardant sound absorbing material wherein a nonwoven fabric layer in which a heat-resistant short aramid fiber and a short thermoplastic polyester fiber are bridged and a skin material layer formed of a wetlaid nonwoven fabric consisting of a short aramid fiber are stacked.

And, Japanese Patent Publication No. 2007-0039826 discloses a water-repellent sound absorbing material wherein a nonwoven fabric layer of a heat-resistant short aramid fiber or a blend of a short aramid fiber and a short thermoplastic polyester fiber and a skin material layer treated with a water repellent are stacked.

And, Japanese Patent Publication No. 2007-0138953 discloses a heat-resistant sound absorbing material wherein a nonwoven fabric layer consisting of a heat-resistant aramid fiber and a skin material layer formed of a fiber sheet containing a heat-resistant aramid fiber are stacked.

Since the sound absorbing materials described above have a structure wherein a skin material layer is laminated on one side of a nonwoven fabric to provide functionalities such as flame retardancy, water repellency and the like, a hot pressing process for integrating the nonwoven fabric layer and the skin material layer is necessary. Consequently, the overall process is complicated and troublesome and a flame retardant, a water repellent and the like included as additives may cause production of toxic gases as a result of combustion during the hot pressing process. In addition, deformation of the internal structure of the nonwoven fabric that may occur during the hot pressing process can lead to deterioration of sound-absorbing property.

SUMMARY

In order solve the above-described problem of the existing art, the inventors of the present invention have researched for a long time to develop a new sound absorbing and insulating material having superior sound-absorbing property, flame retardancy, heat resistance and heat-insulating property and having superior moldability and surface appearance. As a result, they developed a new sound absorbing and insulating material, which provides the effects that physical properties of a nonwoven fabric including sound-absorbing property are improved because a binder penetrates into the nonwoven fabric having irregular micro cavities with a complicated three-dimensional labyrinth structure without blocking the micro cavities and is cured while maintaining the three-dimensional structure inside the nonwoven fabric, molding into a desired shape is possible during the curing of the binder and leakage of the binder impregnated in the nonwoven fabric to the surface of the molded product can be prevented at the same time.

Accordingly, the present invention is directed to providing a sound absorbing and insulating material having superior sound-absorbing property, flame retardancy, heat resistance and heat-insulating property, being moldable into a desired shape during the curing of the binder impregnated in the nonwoven fabric formed of a heat-resistant fiber and capable of providing superior appearance of the molded product and reducing contamination of a mold even after repeated molding due to the presence of an outer sound absorbing and insulating layer.

The present invention is also directed to providing a method for manufacturing a sound absorbing and insulating material, including a step of preparing an inner sound absorbing and insulating layer by immersing a first nonwoven fabric formed of a heat-resistant fiber in a binder solution and then drying and a step of stacking a second nonwoven fabric formed of a heat-resistant fiber on one or both sides of the inner sound absorbing and insulating layer.

The present invention is also directed to providing a method for reducing noise using by using the sound absorbing and insulating material in a noise-generating device.

In an aspect, the present invention provides a sound absorbing and insulating material including: an inner sound absorbing and insulating layer 1 including a first nonwoven fabric containing 30-100 wt % of a heat-resistant fiber and a binder present in the same layer as the first nonwoven fabric and maintaining a three-dimensional structure inside the nonwoven fabric; and an outer sound absorbing and insulating layer 2', 2" including a second nonwoven fabric containing 30-100 wt % of a heat-resistant fiber, wherein the outer sound absorbing and insulating layer 2', 2" is stacked on one or both sides of the inner sound absorbing and insulating layer 1.

In another aspect, the present invention provides a method for manufacturing a sound absorbing and insulating material, including: a) a step of immersing a first nonwoven fabric containing 30-100 wt % of a heat-resistant fiber in a binder solution; b) a step of forming an inner sound absorbing and insulating layer 1 by drying the first nonwoven fabric; and c) a step of forming an outer sound absorbing and insulating layer 2', 2" by stacking a second nonwoven fabric containing 30-100 wt % of a heat-resistant fiber on one or both sides of the inner sound absorbing and insulating layer 1.

In another aspect, the present invention provides a method for reducing noise of a noise-generating device, including: i) a step of checking a three-dimensional shape of a noise-generating device; ii) a step of preparing and molding a sound absorbing and insulating material so as to correspond to the three-dimensional shape of the device partially or entirely; and iii) a step of bringing the sound absorbing and insulating material adjacent to the noise-generating device.

The sound absorbing and insulating material of the present invention, wherein a binder is impregnated into the first nonwoven fabric formed of a heat-resistant fiber, is advantageous in that the sound absorbing and insulating material has superior sound-absorbing property, flame retardancy, heat resistance and heat-insulating property and it can be molded into a three-dimensional shape owing to the binder.

Also, the sound absorbing and insulating material of the present invention is advantageous in that, because the outer sound absorbing and insulating layer formed of a second nonwoven fabric is stacked on one or both sides of the inner sound absorbing and insulating layer, leakage of the binder included in the inner sound absorbing and insulating layer during molding is prevented and the molded product has superior appearance without contamination of a mold.

Also, the sound absorbing and insulating material of the present invention is advantageous in that, if the sound absorbing and insulating material is prepared by further including a functional additive in a binder solution, desired functionality maybe provided to the sound absorbing and insulating material without stacking an additional skin material.

The sound absorbing and insulating material of the present invention is also advantageous in that, since flame retardancy, heat resistance and heat-insulating property are superior in addition to sound-absorbing property, the sound absorbing and insulating material is not deformed or denatured even when used in a noise-generating device maintained at high temperatures of 200° C. or above.

Further, the sound absorbing and insulating material of the present invention is advantageous in that, if a thermosetting resin is used as the binder, molding into a desired shape is possible during the curing of the thermosetting resin. That is to say, the overall process can be simplified since the curing and molding of the thermosetting resin are achieved simultaneously.

In addition, the sound absorbing and insulating material of the present invention is advantageous in that, since a nonwoven fabric formed of a heat-resistant fiber is used, thermal deformation of the nonwoven fabric due to the reaction heat of thermal curing does not occur even when a thermosetting resin is used as the binder.

Accordingly, the sound absorbing and insulating material of the present invention is useful as a sound absorbing and insulating material in the applications requiring arresting, absorbing or insulating of sound, including electric appliances such as air conditioner, refrigerator, washing machine, lawn mower and the like, transportation such as automobile, ship, airplane and the like, construction materials such as wall material, flooring material and the like, and so forth. The sound absorbing and insulating material of the present invention is useful as a sound absorbing and insulating material for a noise-generating device maintained at high temperatures of 200° C. or above. In particular, when the sound absorbing and insulating material of the present invention is used in an automobile, it may be closely attached to a noise-generating device of the automobile such as engine, exhaust system and the like, provided with a distance from the noise-generating device, or molded as a part of the noise-generating device.

BRIEF DESCRIPTION OF DRAWINGS

FIG. 1A shows the cross-sectional structure of a sound absorbing and insulating material wherein a second nonwoven fabric not impregnated with a binder is stacked on one side of a first nonwoven fabric uniformly impregnated with a binder, with an adhesive layer disposed therebetween. FIG. 1B shows the cross-sectional structure of a sound absorbing and insulating material wherein two second nonwoven fabrics not impregnated with a binder are stacked on both sides of a first nonwoven fabric uniformly impregnated with a binder, with adhesive layers disposed therebetween.

FIG. 2A is an image of a first nonwoven fabric before impregnation of a binder, FIG. 2B is an image of a first nonwoven fabric in which 20 parts by weight of a binder has been impregnated based on 100 parts by weight of the nonwoven fabric, and FIG. 2C is an image of a first nonwoven fabric in which 50 parts by weight of a binder has been impregnated based on 100 parts by weight of the nonwoven fabric.

3A is an image of a sound absorbing and insulating material molded for use in an automobile engine, and FIG. 3B shows an example wherein a sound absorbing and insulating material is applied in a part of an automobile engine.

FIG. 4A is an image of a sound absorbing and insulating material molded for use in a lower part of an automobile, and FIG. 4B shows an example wherein a sound absorbing and insulating material is attached to a lower part of an automobile.

DETAILED DESCRIPTION OF MAIN ELEMENTS

Figure 1A:
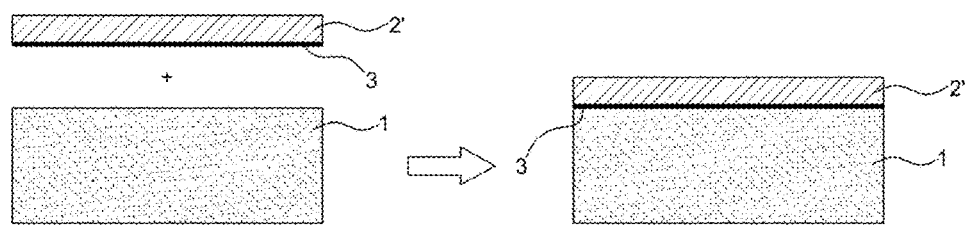
FIGS. 1A-1B schematically show the cross-sectional structure of a sound absorbing and insulating material of the present invention.

1: inner sound absorbing and insulating layer
2', 2": outer sound absorbing and insulating layer
3: adhesive layer

DETAILED DESCRIPTION

The present invention relates to a sound absorbing and insulating material with superior moldability and appearance and a method for manufacturing the same. The sound absorbing and insulating material of the present invention has superior sound-absorbing property, flame retardancy, heat resistance, heat-insulating property, is moldable into a desired three-dimensional shape using a binder present in the same layer as a nonwoven fabric formed of a heat-resistant fiber and is free from the appearance problem of a molded product caused by leakage of the binder during molding.

In an aspect, the present invention provides a sound absorbing and insulating material including: an inner sound absorbing and insulating layer 1 including a first nonwoven fabric containing 30-100 wt % of a heat-resistant fiber and a binder present in the same layer as the first nonwoven fabric and maintaining a three-dimensional structure inside the nonwoven fabric; and an outer sound absorbing and insulating layer 2', 2" including a second nonwoven fabric containing 30-100 wt % of a heat-resistant fiber, wherein the outer sound absorbing and insulating layer 2', 2" is stacked on one or both sides of the inner sound absorbing and insulating layer 1.

In an exemplary embodiment of the present invention, the stacking between the inner sound absorbing and insulating layer and the outer sound absorbing and insulating layer may be achieved by an adhesive, heat or pressure.

In an exemplary embodiment of the present invention, an adhesive may be coated on one side of the outer sound absorbing and insulating layer and then the outer sound absorbing and insulating layer may be stacked by contacting the adhesive-coated side with the inner sound absorbing and insulating layer.

In an exemplary embodiment of the present invention, the adhesive used for the stacking between the inner sound absorbing and insulating layer and the outer sound absorbing and insulating layer may be the binder contained in the first nonwoven fabric.

In an exemplary embodiment of the present invention, the adhesive may be a thermosetting resin.

In an exemplary embodiment of the present invention, the heat-resistant fiber may have a limiting oxygen index (LOI) of 25% or greater and a heat resistance temperature of 150° C. or greater.

In an exemplary embodiment of the present invention, the heat-resistant fiber may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

In another exemplary embodiment of the present invention, the heat-resistant fiber may be an aramid fiber.

In an exemplary embodiment of the present invention, the first nonwoven fabric or the second nonwoven fabric may be formed of an aramid fiber having a fineness of 1-15 denier and may be a single-layered nonwoven fabric having a thickness of 3-20 mm.

In an exemplary embodiment of the present invention, the first nonwoven fabric or the second nonwoven fabric may have a density of 100-2000 g/m$^2$.

In another exemplary embodiment of the present invention, the first nonwoven fabric or the second nonwoven fabric may have a density of 200-1200 g/m$^2$.

In an exemplary embodiment of the present invention, the inner sound absorbing and insulating layer may be formed of a single layer or two or more layers.

In an exemplary embodiment of the present invention, the binder may be a thermosetting resin.

In another exemplary embodiment of the present invention, the thermosetting resin may be an epoxy resin capable of forming a three-dimensional network structure in the internal structure of the first nonwoven fabric.

In another exemplary embodiment of the present invention, the epoxy resin may be one or more epoxy resin selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

The structure of the sound absorbing and insulating material according to the present invention is described in more detail referring to FIGS. 1A-1B and FIGS. 2A-2C.

Figure 1B:
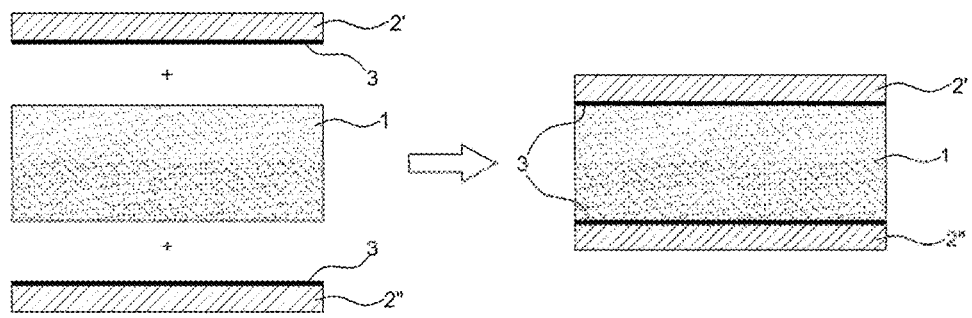

FIGS. 1A-1B schematically show the cross-sectional structure of a sound absorbing and insulating material of the present invention. FIG. 1A shows the cross section of a sound absorbing and insulating material wherein an outer sound absorbing and insulating layer 2' is formed as a second nonwoven fabric is stacked on one side of an inner sound absorbing and insulating layer 1 including a first nonwoven fabric and a binder, with an adhesive layer disposed therebetween. FIG. 1B shows the cross section of a sound absorbing and insulating material wherein outer sound absorbing and insulating layers 2', 2" are formed as two second nonwoven fabrics are stacked on both sides of an inner sound absorbing and insulating layer 1 including a first nonwoven fabric and a binder, with adhesive layers disposed therebetween.

Figure 2A:
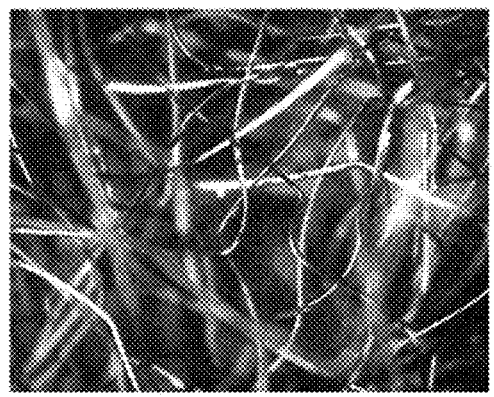
FIGS. 2A-2C show electron microscopic images (×300) of a first nonwoven fabric before and after impregnation of a binder.
Figure 2B:
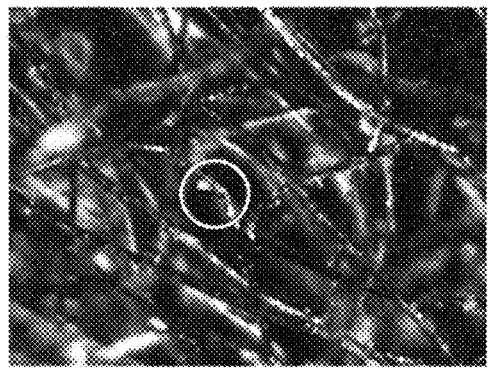
Figure 2C:
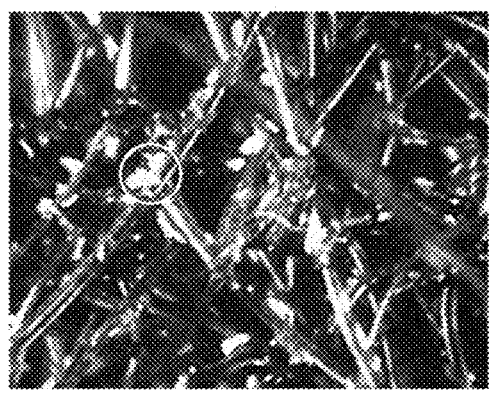

FIGS. 2S-2C show electron microscopic images showing the three-dimensional structure inside the first nonwoven fabric constituting the inner sound absorbing and insulating layer 1.

FIG. 2A shows an electron microscopic image showing the internal structure of the first nonwoven fabric before impregnation of the binder. It can be seen that heat-resistant fiber yarns cross each other to form irregular micro cavities. FIGS. 2B and 2C are electron microscopic images after impregnation of the binder into the first nonwoven fabric. It can be seen that the binder is finely and uniformly distributed and attached to the heat-resistant fiber yarns. Also, it can be seen that the content of the binder on the yarn surface increases as the content of the binder increases.

Although there may be differences depending on the preparation method, fibers are randomly arranged three-dimensionally in the first nonwoven fabric or the second nonwoven fabric used for the preparation of the sound absorbing and insulating material in the present invention. Accordingly, the pore structure inside a nonwoven fabric tends to be a very complicated labyrinth structure (labyrinth system) wherein regularly or irregularly arranged fibers are three-dimensionally interconnected rather than bundles of independent capillary tubes. That is to say, the nonwoven fabric used in the present invention has irregular micro cavities (micro cavity) formed as the yarns formed of the heat-resistant fiber loosely cross each other.

If the binder is impregnated into the nonwoven fabric, the binder is finely and uniformly distributed and attached to the surface of the nonwoven fabric yarns formed of the heat-resistant fiber, thereby forming much finer micro cavities than before the impregnation. The formation of fine micro cavities in the internal structure of the nonwoven fabric means increased resonance of noise and thus improved sound-absorbing property. If the binder forms a three-dimensional network structure as it is cured, the sound-absorbing property can be further improved since more fine micro cavities can be formed inside the nonwoven fabric.

Accordingly, since the nonwoven fabric can maintain the intrinsic three-dimensional structure as the binder is uniformly impregnated into the nonwoven fabric and, additionally, since more fine micro cavities can be formed as the binder is cured, the sound absorbing and insulating material of the present invention has remarkably improved sound-absorbing performance owing to the maximized noise absorption through increased resonance in the nonwoven fabric.

As seen from the electron microscopic images of FIGS. 2A2C, the inner sound absorbing and insulating layer of the present invention has an internal structure in which the binder is uniformly dispersed and distributed on the surface of the heat-resistant fiber yarns constituting the nonwoven fabric.

Hereinafter, the constituents of the sound absorbing and insulating material according to the present invention having such an internal structure are described in more detail.

In the present invention, a heat-resistant fiber is used as the main fiber constituting the first nonwoven fabric or the second nonwoven fabric.

The heat-resistant fiber may be any one having superior durability and capable of enduring high-temperature and ultrahigh-temperature conditions. Specifically, the heat-resistant fiber may be one having a limiting oxygen index (LOI) of 25% or greater and a heat resistance temperature of 150° C. or greater. More specifically, the heat-resistant fiber may be one having a limiting oxygen index (LOI) of 25-80% and a heat resistance temperature of 150-30000° C. Most specifically, the heat-resistant fiber may be one having a limiting oxygen index (LOI) of 25-70% and a heat resistance temperature of 200-1000° C. And, the heat-resistant fiber may have a fineness of 1-15 denier, specifically 1-6 denier and a yarn length of 20-100 mm, specifically 40-80 mm.

The heat-resistant fiber may be a 'super fiber' as commonly called in the related art. Specifically, the super fiber may be one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber.

Specifically, an aramid fiber may be used as the heat-resistant fiber in the present invention. More specifically, meta-aramid, para-aramid or a mixture thereof may be used as the heat-resistant fiber in the present invention. The aramid fiber used as the yarn of the nonwoven fabric in the present invention may have a fineness of 1-15 denier, specifically 1-6 denier, and a yarn length of 20-100 mm, specifically 40-80 mm. If the yarn length is too short, bridging of yarns may be difficult during needle punching. As a result, cohesion of the nonwoven fabric may be weak. And, if the yarn length is too long, cohesion of the nonwoven fabric may be superior but movement of yarns may be difficult during carding.

The aramid fiber is an aromatic polyamide fiber wherein aromatic rings such as benzene ring are bonded with each other by amide groups. To distinguish from an aliphatic polyamide (e.g., nylon), the aromatic polyamide fiber is called 'aramid'. The aramid fiber is prepared by spinning of aromatic polyamide and is classified into meta-aramid and para-aramid depending on the location of the amide bonds.

[Chemical Formula 1]

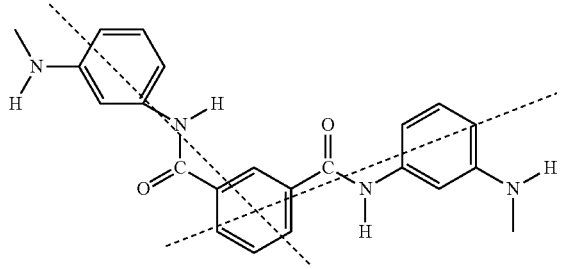

[Chemical Formula 2]

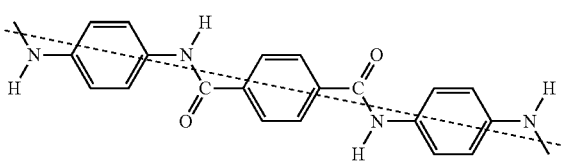

The meta-aramid (m-aramid) represented by Chemical Formula 1 is prepared by dry spinning after dissolving isophthaloyl chloride and m-phenylenediamine in a dimethylacetamide (DMAc) solvent. The meta-aramid has a relatively high elongation at break of 22-40% due to the uneven polymer structure, is dyeable and can be easily prepared into fiber. The meta-aramid is commercially available under the trade names Nomex™ (DuPont) and Conex™ (Teijin).

The para-aramid (p-aramid) represented by Chemical Formula 2 is prepared by wet spinning after dissolving terephthaloyl chloride and p-phenylenediamine in an N-methylpyrrolidone (NMP) solvent. The para-aramid has high strength due to its highly oriented linear molecular structure. Being stronger than meta-aramid about 3-7 times, it is used for reinforcement or protection materials. Also, the para-aramid exhibits strong chemical resistance, less thermal shrinkage and superior dimensional stability as well as high tensile strength, flame resistance and self-extinguishing property. The para-aramid is commercially available under the trade names Kevlar™ (DuPont), Twaron™ (Teijin) and Technora™ (Teijin).

The aramid is provided in the form of filament, staple, yarn and the like and is used for reinforcing materials (transformer, motor and the like), insulating materials (insulating paper, insulating tape and the like), heat-resistant fibers (fireproof clothing, gloves and the like), high-temperature filters, or the like.

Although the nonwoven fabric constituting the sound absorbing and insulating material of the present invention is practically prepared from the heat-resistant fiber yarn, nonwoven fabrics prepared by further adding other fibers to the heat-resistant fiber yarn, to reduce cost or provide reduced weight, functionality and the like to the nonwoven fabric, may also be included in the scope of the present invention. That is to say, although the nonwoven fabric of the present invention is prepared from the heat-resistant fiber yarn, the present invention is never limited to the nonwoven fabric formed only of the heat-resistant fiber. The nonwoven fabric of the present invention may include the heat-resistant fiber yarn in an amount of 30-100 wt %, more specifically 60-100 wt %, based on the weight of the nonwoven fabric.

Further, the inner sound absorbing and insulating layer of the sound absorbing and insulating material of the present invention includes the binder which is present in the same layer as the nonwoven fabric and maintains the three-dimensional structure inside the nonwoven fabric. The binder used in the present invention may be any one capable of maintaining the three-dimensional structure inside the nonwoven fabric. The expression 'maintaining the three-dimensional structure inside the nonwoven fabric' means that the binder, which has been impregnated into the nonwoven fabric, is uniformly distributed and attached to the surface of the fiber yarn of the nonwoven fabric and maintains or further forms irregular micro cavities, thereby maintaining the original three-dimensional structure inside the nonwoven fabric.

Although a binder generally refers to a material used to adhere or join two materials, the term binder used in the present invention refers to a material impregnated into the nonwoven fabric formed of the heat-resistant fiber.

Many materials can be used as the binder impregnated into the nonwoven fabric. First, a thermoplastic resin or a thermosetting resin may be considered as the binder material.

The thermoplastic resin which is represented by a polyamide-based resin has crystalline polar groups like the aramid fiber as a representative heat-resistant fiber. As such, if a thermoplastic binder is impregnated into the nonwoven fabric formed of the thermoplastic heat-resistant fiber, a strong interfacial layer is formed between them by face-to-face contact between the similar crystalline polar groups, which partially blocks the micro cavities of the nonwoven fabric. That is to say, if a thermoplastic resin is used as the binder impregnated into the nonwoven fabric formed of the thermoplastic heat-resistant fiber, sound-absorbing performance is decreased owing to the partial blocking of the micro cavities of the nonwoven fabric. At a glimpse, it may be thought that the sound-absorbing performance would be improved if the micro cavities are blocked. But, since noise is not extinguished inside the nonwoven fabric but is transmitted via other routes, improvement of sound-absorbing performance cannot be expected if the thermoplastic binder is impregnated. And, if the thermoplastic binder is impregnated into a nonwoven fabric formed of the inorganic-based heat-resistant fiber, an adhesive additive has to be further added because of weak binding.

In contrast, a thermosetting binder has totally different physical and chemical properties from the thermoplastic heat-resistant fiber. Accordingly, if a thermosetting binder is impregnated into the nonwoven fabric formed of the thermoplastic heat-resistant fiber, an interfacial layer is formed by edge-to-edge contact because of the difference in characteristics. As a result, the micro cavities of the nonwoven fabric remain open. That is to say, if a thermosetting resin is used as the binder impregnated into the nonwoven fabric formed of the heat-resistant fiber, the three-dimensional structure inside the nonwoven fabric can be maintained. Accordingly, a thermosetting resin may be used preferably as the binder in the present invention.

Furthermore, the thermosetting resin has the characteristics that it is curable with light, heat or a curing agent and its shape is not deformed even at high temperatures. Accordingly, by using the heat-resistant fiber and the thermosetting binder with a specific condition, the present invention is advantageous in that the shape of the sound absorbing and insulating material can be maintained even at high temperatures. Therefore, if a thermosetting resin is used as the binder impregnated into the nonwoven fabric, molding into a desired shape can be achieved during the curing of the resin and the resulting shape can be maintained even at high temperatures.

As described above, if a thermosetting resin is used as the binder impregnated into the nonwoven fabric formed of the heat-resistant fiber, the effects of maintaining the three-dimensional structure inside the nonwoven fabric and molding into a desired shape during the curing of the binder resin can be expected.

More specifically, an epoxy resin may be used as the binder. The epoxy resin is a kind of a thermosetting resin and is curable into a polymer material having a three-dimensional network structure. Accordingly, since the epoxy resin can form a network structure and thus micro cavities when cured inside the nonwoven fabric, more fine micro cavities can be formed inside the nonwoven fabric and the sound-absorbing performance can be further improved.

Further, since a more advanced three-dimensional network structure can be formed if the curing is carried out in the presence of a curing agent, the sound-absorbing effect can be further improved. That is to say, a three-dimensional network-structured polymer is formed as the epoxy groups or hydroxy groups of the epoxy resin react with the functional groups of the curing agent such as amine groups or carboxylic acid groups to form covalent crosslinkages. The curing agent not only serves as a catalyst that catalyzes curing reaction but also is directly involved in the reaction and is linked in the molecule of the epoxy resin. Accordingly, the size and physical properties of the micro cavities can be controlled by selecting different curing agents.

The epoxy resin may be one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin, o-cresol novolac epoxy resin and the like. The epoxy resin may be one having an epoxy equivalent of 70-400. If the epoxy equivalent is too low, intermolecular binding may be too weak to form a three-dimensional network structure or the physical properties of the sound absorbing and insulating material may be unsatisfactory because of weak adhesion with the heat-resistant fiber. And, if the epoxy equivalent is too high, the physical properties of the sound absorbing and insulating material may be unsatisfactory because a very dense network structure is formed.

If a thermosetting resin is used as the binder in the present invention, the curing agent may be included in a binder solution. The curing agent may be one having functional groups that can react readily with the functional groups of the binder such as epoxy groups or hydroxy groups. As the curing agent, an aliphatic amine, an aromatic amine, an acid anhydride, urea, an amide, imidazole and the like may be used. Specifically, the curing agent may be one or more selected from a group consisting of diethyltoluenediamine (DETDA), diaminodiphenylsulfone (DDS), boron trifluoride-monoethylamine ($BF_3$.MEA), diaminocyclohexane (DACH), methyltetrahydrophtalic anhydride (MTHPA), methyl-5-norbornene-2,3-dicarboxylic anhydride (NMA), dicyandiamide (Dicy), 2-ethyl-4-methylimidazole and the like. More specifically, an aliphatic amine- or amide-based curing agent may be used because they have relatively good crosslinking ability and very superior chemical resistance and weather resistance. Most specifically, dicyandiamide (Dicy) may be used in consideration of crosslinking ability, flame retardancy, heat resistance, storage stability, processability and the like. Because dicyandiamide (Dicy) has a high melting point above 200° C., it retains superior storage stability after being mixed with the epoxy resin and can ensure sufficient processing time for curing and molding.

Further, a catalyst that facilitates the curing of the thermosetting resin used as the binder may be used in the present invention. The catalyst may be one or more selected from a group consisting of urea, dimethylurea, a tetraphenylborate salt of quaternary DBU, quaternary phosphonium bromide and the like. The catalyst may be included in the binder-containing solution.

In addition, various additives, e.g., a flame retardant, a heat resistance improver, a water repellent and the like, may be used to provide functionalities to the sound absorbing and insulating material. The additive is included in the binder solution and no additional skin material for providing functionalities to the sound absorbing and insulating material is necessary.

The flame retardant may be melamine, a phosphate, a metal hydroxide and the like. Specifically, one or more selected from a group consisting of melamine, melamine cyanurate, melamine polyphosphate, phosphazene, ammonium polyphosphate and the like may be used as the flame retardant. More specifically, the flame retardant may be melamine, which can enhance flame retardancy and heat resistance at the same time.

The heat resistance improver may be alumina, silica, talc, clay, glass powder, glass fiber, metal powder and the like.

One or more fluorine-based water repellent may be used as the water repellent.

In addition, additives commonly used in the art may be selected and used depending on purposes.

The inner sound absorbing and insulating layer of the sound absorbing and insulating material of the present invention may be formed of a single layer or two or more layers. The inner sound absorbing and insulating layer may be formed of a single layer or multiple layers for control of the overall thickness of the sound absorbing and insulating material. The single-layered or multiple-layered structure of the inner sound absorbing and insulating layer is not particularly limited in the present invention.

In the sound absorbing and insulating material of the present invention, the outer sound absorbing and insulating layer formed of a second nonwoven fabric containing 30-100 wt % of a heat-resistant fiber is stacked on one or both sides of the inner sound absorbing and insulating layer. As the outer sound absorbing and insulating layer is stacked on the outer surface of the inner sound absorbing and insulating layer, appearance problem due to leakage of the binder included in the inner sound absorbing and insulating layer during molding and contamination of a mold due to repeated molding can be prevented.

The outer sound absorbing and insulating layer may be stacked using an adhesive layer containing an adhesive or using heat or pressure. For example, when the stacking is performed using an adhesive, an adhesive may be coated on one side of the second nonwoven fabric and then the second nonwoven fabric may be stacked by contacting with the inner sound absorbing and insulating layer. The adhesive may be any one commonly used in the art. Because the binder impregnated into the inner sound absorbing and insulating layer in the present invention also has adhesive property, the binder may also be used as the adhesive. Specifically, when the binder is used as the adhesive, a thermosetting resin may be used because stronger adhesive effect is expected since the thermosetting resin is cured by the heat applied during molding. More specifically, an epoxy resin may be used as the adhesive. The amount of the adhesive used is not particularly limited in the present invention. The amount can be controlled within a range allowed for the adhesion of the two layers.

In another aspect, the present invention provides a method for manufacturing a sound absorbing and insulating material, including: a) a step of immersing a first nonwoven fabric containing 30-100 wt % of a heat-resistant fiber in a binder solution; b) a step of forming an inner sound absorbing and insulating layer 1 by drying the first nonwoven fabric; and c) a step of forming an outer sound absorbing and insulating layer 2', 2" by stacking a second nonwoven fabric containing 30-100 wt % of a heat-resistant fiber on one or both sides of the inner sound absorbing and insulating layer 1.

Hereinafter, the steps of the method for manufacturing a sound absorbing and insulating material according to the present invention are described in detail.

In the step a), a first nonwoven fabric formed of a heat-resistant fiber is immersed in a binder solution.

In the present invention, the first nonwoven fabric is immersed in the binder solution so as to improve sound-absorbing and sound-insulating performance and to allow molding of the sound absorbing and insulating material into a desired shape. The binder solution in which the first nonwoven fabric is immersed contains, in addition to a binder resin, a curing agent, a catalyst, commonly used additives and a solvent. The binder, the curing agent, the catalyst and the commonly used additives contained in the binder solution are the same ad described above. The solvent used to prepare the binder solution may be one or more selected from a group consisting of a ketone, a carbonate, an acetate, a cellosolve and the like. Specifically, the solvent may be one or more selected from a group consisting of acetone, methyl ethyl ketone (MEK), methyl isobutyl ketone (MIBK), dimethyl carbonate (DMC), ethyl acetate, butyl acetate, methyl cellosolve, ethyl cellosolve, butyl cellosolve and the like.

Specifically, the binder solution used in the present invention may contain 1-60 wt % of a binder and a solvent as the remainder. The binder solution used in the present invention may further contain a curing agent and other additives including a catalyst. In this case, the binder solution may contain 1-60 wt % of a binder, 0.1-10 wt % of a curing agent, 0.01-5 wt % of a catalyst, 1-40 wt % of additives and a solvent as the remainder. More specifically, the binder solution may contain 1-30 wt % of a binder, 0.1-10 wt % of a curing agent, 0.01-5 wt % of a catalyst, 1-30 wt % of a flame retardant as an additive and 40-95 wt % of a solvent.

The degree of impregnation into the nonwoven fabric may be controlled by controlling the concentration of the binder solution of the present invention. Specifically, the binder solution may be prepared to have a solid content of 1-60 wt %, more specifically 20-50 wt %. If the binder solution is too thin, the purpose of the present invention cannot be accomplished because the content of the binder impregnated into the nonwoven fabric is small. And, if the binder solution is too thick, the nonwoven fabric may become hard and may not serve as a sound absorbing and insulating material.

If the content of the curing agent contained in the binder solution is too low, molding into a desired shape may be difficult because complete curing of the binder cannot be expected. As a result, the effect of improving the mechanical strength of the sound absorbing and insulating material may be unsatisfactory. And, if the content is too high, the sound absorbing and insulating material may become hard and storage stability and the like may be unsatisfactory. If the content of the catalyst is too low, the effect of facilitating reaction may be insignificant. And, if the content of the catalyst is too high, storage stability and the like may be unsatisfactory. The additives may be one or more additive(s) commonly used in the art, including a flame retardant, a heat resistance improver, a water repellent and the like. The content of these additives may be adjusted adequately depending on the purpose of addition. If the addition amount is too small, the desired effect may not be achieved. And, too large an addition amount may be economically unfavorable and may cause undesired side effects.

In the step b), an inner sound absorbing and insulating layer is prepared by drying the first nonwoven fabric.

The drying in the present invention is carried out by taking out the first nonwoven fabric from the binder solution and removing the solvent. The drying may be carried out at appropriate temperatures under pressure. Specifically, the drying process may include a process of taking out the nonwoven fabric and controlling the binder content in the nonwoven fabric by compressing at a pressure of 1-20 kgf/cm$^2$. Also, the drying process may include a process of taking out the nonwoven fabric and evaporating the solvent by heating at a temperature of 70-200° C. Also, the drying process may include a process of compressing the nonwoven fabric at a pressure of 1-20 kgf/cm$^2$ and then heating at a temperature of 70-200° C. after taking out the nonwoven fabric.

The drying in the present invention is a process whereby the content of the binder in the nonwoven fabric is controlled. With this, the physical properties of the sound absorbing and insulating material can be controlled. The content of the binder included in the nonwoven fabric after the drying is an important factor determining the size, shape and distribution of micro cavities inside the sound absorbing and insulating material. Accordingly, the sound-absorbing property and mechanical property of the sound absorbing and insulating material may be controlled therewith. In the present invention, the drying may be carried out such that the final content of the binder included in the nonwoven fabric is 1-300 parts by weight, more specifically 30-150 parts by weight, based on 100 parts by weight of the nonwoven fabric.

In the step c), an outer sound absorbing and insulating layer is formed by stacking a second nonwoven fabric containing 30-100 wt % of a heat-resistant fiber on one or both sides of the inner sound absorbing and insulating layer. That is to say, by stacking the outer sound absorbing and insulating layer formed of a nonwoven fabric on one or both sides of the inner sound absorbing and insulating layer, appearance problem due to leakage of the binder included in the inner sound absorbing and insulating layer during molding and contamination of a mold due to repeated molding can be prevented.

The stacking may be accomplished by bonding using an adhesive or using heat or pressure. For example, when the stacking is performed using an adhesive, an adhesive may be coated on one side of the outer sound absorbing and insulating layer and then stacking the outer sound absorbing and insulating layer on the inner sound absorbing and insulating layer.

The method for manufacturing a sound absorbing and insulating material according to the present invention may further include, after the step c), d) a step of molding the sound absorbing and insulating material at high temperature.

Specifically, the method for manufacturing a sound absorbing and insulating material including the step d) may include: a) a step of immersing a first nonwoven fabric containing 30-100 wt % of a heat-resistant fiber in a binder solution; b) a step of forming an inner sound absorbing and insulating layer 1 by drying the first nonwoven fabric; c) a step of forming an outer sound absorbing and insulating layer 2', 2" by stacking a second nonwoven fabric containing 30-100 wt % of a heat-resistant fiber on one or both sides of the inner sound absorbing and insulating layer 1; and d) a step of molding the sound absorbing and insulating material at high temperature.

In the step d), the sound absorbing and insulating material is molded at high temperature after stacking the inner sound absorbing and insulating layer and the outer sound absorbing and insulating layer. The molding at high temperature considers also the curing of the thermosetting binder and is carried out at a temperature of 150-300° C., more specifically at a temperature of 170-230° C.

The method for manufacturing a sound absorbing and insulating material according to the present invention may further include, before the step a), a step of forming a first nonwoven fabric or a second nonwoven fabric by a needle punching process using a heat-resistant fiber. For example, in the step a-1), a nonwoven fabric having a thickness of 3-20 mm may be formed by a needle punching process of a heat-resistant aramid fiber having a fineness of 1-15 denier.

For example, the method for manufacturing a sound absorbing and insulating material according to the present invention including the step a-1) may include: a-1) a step of forming a first nonwoven fabric or a second nonwoven fabric by a needle punching process using a heat-resistant fiber; a) a step of immersing the first nonwoven fabric containing 30-100 wt % of a heat-resistant fiber in a binder solution; b) a step of forming an inner sound absorbing and insulating layer 1 by drying the first nonwoven fabric; and c) a step of forming an outer sound absorbing and insulating layer 2', 2" by stacking the second nonwoven fabric containing 30-100 wt % of a heat-resistant fiber on one or both sides of the inner sound absorbing and insulating layer 1.

For example, the method for manufacturing a sound absorbing and insulating material according to the present invention including the step a-1) may also include: a-1) a step of forming a first nonwoven fabric or a second nonwoven fabric by a needle punching process using a heat-resistant fiber; a) a step of immersing the first nonwoven fabric containing 30-100 wt % of a heat-resistant fiber in a binder solution; b) a step of forming an inner sound absorbing and insulating layer 1 by drying the first nonwoven fabric; c) a step of forming an outer sound absorbing and insulating layer 2', 2" by stacking the second nonwoven fabric containing 30-100 wt % of a heat-resistant fiber on one or both sides of the inner sound absorbing and insulating layer 1; and d) a step of molding the sound absorbing and insulating material at high temperature.

The nonwoven fabric used for the inner sound absorbing and insulating layer and the outer sound absorbing and insulating layer in the present invention is a nonwoven fabric prepared by a needle punching process, which contains 30-100 wt % of a heat-resistant fiber. The sound-absorbing property may vary depending on the thickness and density of the nonwoven fabric. It is expected that the sound-absorbing property will improve as the thickness and density of the nonwoven fabric are increased.

The first nonwoven fabric or the second nonwoven fabric used in the present invention may have a thickness of 3-20 mm when considering the industrial field and the like where the sound absorbing and insulating material is used. If the thickness of the nonwoven fabric is smaller than 3 mm, the durability and moldability of the sound absorbing and insulating material may be unsatisfactory. And, if the thickness exceeds 20 mm, productivity may decrease and production cost may increase. And, the density of the nonwoven fabric may be 100-2000 $g/m^2$, specifically 200-1200 $g/m^2$, more specifically 300-800 $g/m^2$, when considering performance and cost.

The nonwoven fabric is formed by stacking a web of 30-100 $g/m^2$ formed by carding two 2- to 12-fold and continuously performing up-down preneedling, down-up needling and up-down needling, thereby forming physical bridges that provide the necessary thickness, binding strength and other desired physical properties. The needle used to perform the needling may be a barb-type needle, having a working blade of 0.5-3 mm and a needle length (the distance from crank outside to point) of 70-120 mm. Specifically, the needle stroke may be 30-350 times/$m^2$.

More specifically, the fineness of yarn for the nonwoven fabric may be 1.5-8.0 denier, the thickness of the pile layer may be 6-13 mm, the needle stroke may be 120-250 times/$m^2$, and the density of the nonwoven fabric may be 300-800 $g/m^2$.

The internal structure of the sound absorbing and insulating material manufactured by the method described above may be confirmed using an electron microscope. When observed with an electron microscope, the sound absorbing and insulating material of the present invention has 1-100 µm-sized micro cavities distributed inside thereof. The micro cavities are distributed regularly or irregularly with a spacing of 0.1-500 µm.

In another aspect, the present invention provides a method for reducing noise of a noise-generating device, including: i) checking a three-dimensional shape of a noise-generating device; ii) preparing and molding a sound absorbing and insulating material so as to correspond to the three-dimensional shape of the device partially or entirely; and iii) bringing the sound absorbing and insulating material adjacent to the noise-generating device.

The device refers to a noise-generating device including a motor, an engine, an exhaust system and the like. However, the scope of the device is never limited to the motor, engine and exhaust system. The sound absorbing and insulating material may be manufactured to correspond to the three-dimensional shape of the device partially or entirely. Since the sound absorbing and insulating material of the present invention is moldable during curing of the binder, the sound absorbing and insulating material may be molded to correspond to the three-dimensional shape of the device partially or entirely.

The expression "adjacent" means closely attaching the sound absorbing and insulating material to the noise-generating device, providing it with a distance from the noise-generating device, or molding it as a part of the noise-generating device. The expression adjacent also includes mounting the sound absorbing and insulating material to a member connected to the noise-generating device (e.g., another sound absorbing and insulating material).

FIG. 3A-3B and FIG. 4A-4B schematically show representative examples wherein the sound absorbing and insulating material of the present invention is applied to a noise-generating device of an automobile.

Figure 3A:
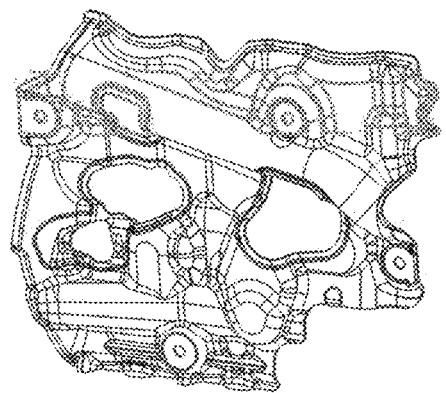
FIGS. 3A-3B schematically show an example of a sound absorbing and insulating material applied to a noise-generating device of an automobile after molding as a part. FIG.
Figure 3B:
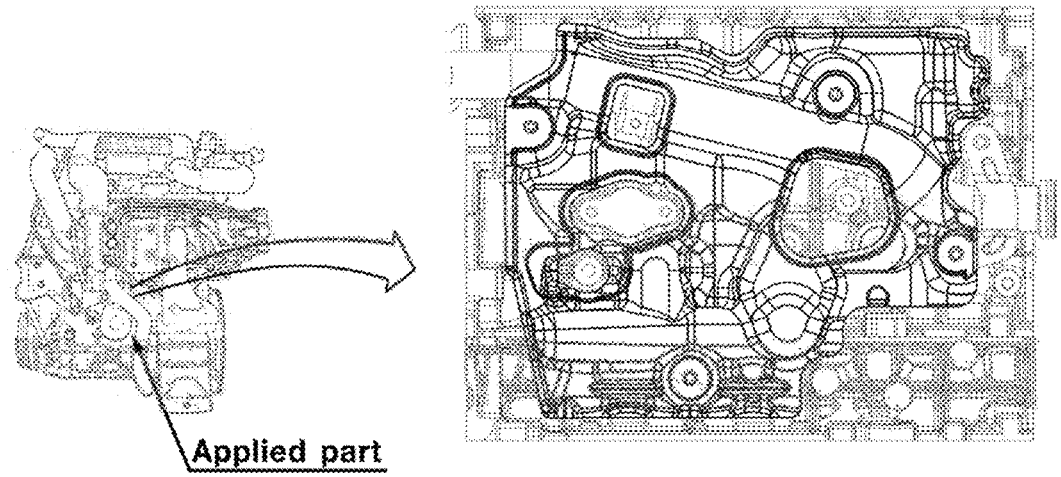

FIG. 3A-3B schematically show an example wherein a sound absorbing and insulating material is molded as a part and applied to a noise-generating device of an automobile. FIG. 3A is an image of a sound absorbing and insulating material molded to be used in an automobile engine, and FIG. 3B shows an example wherein the sound absorbing and insulating material is applied in a part of an automobile engine.

Figure 4A:
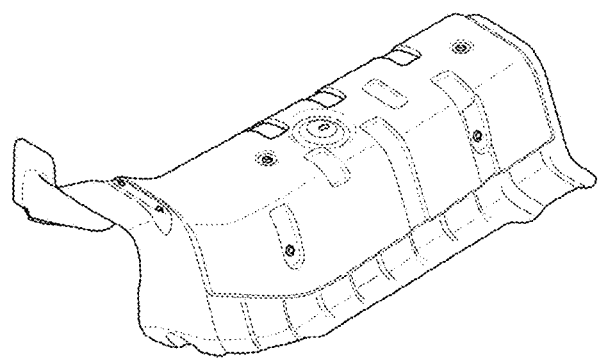
FIGS. 4A-4B schematically show an example wherein a sound absorbing and insulating material is applied to noise-generating device of an automobile with some distance.
Figure 4B:
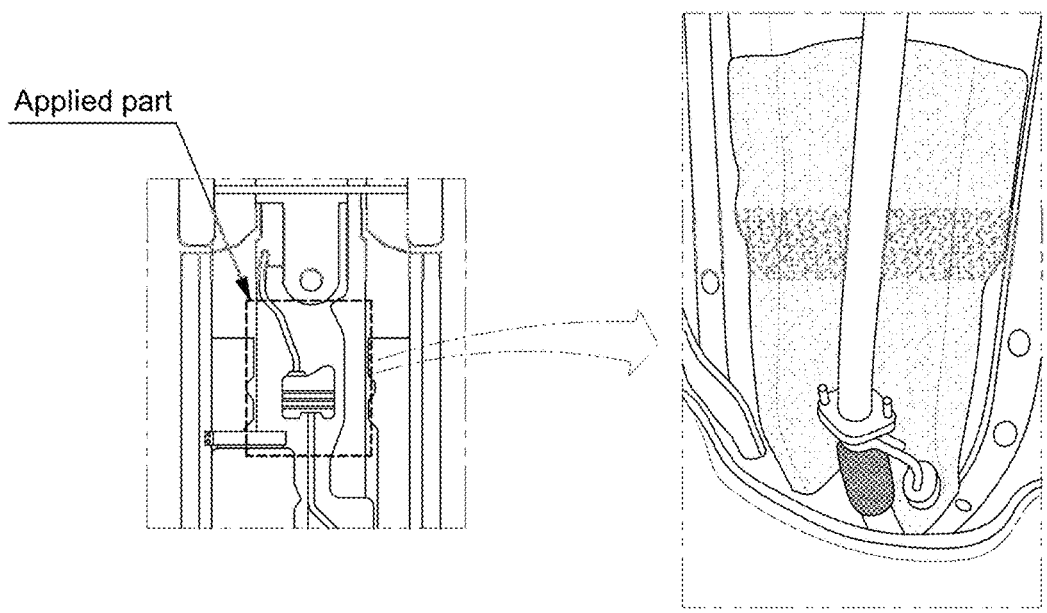

FIGS. 4A-4B schematically show an example wherein a sound absorbing and insulating material is applied to a noise-generating device of an automobile. FIG. 4A is an image of a sound absorbing and insulating material molded to be used in a lower part of an automobile, and FIG. 4B shows an example wherein the sound absorbing and insulating material is attached to a lower part of an automobile.

As described above, the sound absorbing and insulating material of the present invention, wherein the binder is impregnated to maintain the three-dimensional structure inside the nonwoven fabric, has superior sound-absorbing property, flame retardancy, heat resistance and heat-insulating property and can exhibit the desired sound-absorbing performance without deformation after molding when directly applied to a noise-generating device maintained at high temperatures of 200° C. or above. In addition, because the outer sound absorbing and insulating layer formed of the second nonwoven fabric not impregnated with a binder is stacked on the surface of the sound absorbing and insulating material, appearance problem due to leakage of the binder included in the inner sound absorbing and insulating layer during molding and contamination of a mold due to repeated molding can be prevented.

EXAMPLES

Hereinafter, the present invention is described in more detail through examples. However, the scope of the present invention is not limited by the examples.

Examples

Preparation of Sound Absorbing and Insulating Material

Example 1. Preparation of Sound Absorbing and Insulating Material in which Outer Sound Absorbing and Insulating Layers are Stacked on Both Sides 1) Preparation of Epoxy Resin-Impregnated First Aramid Nonwoven Fabric A meta-aramid short fiber having a limiting oxygen index (LOI) of 40%, a heat resistance temperature of 300° C., a fineness of 2 denier and a length of 51 mm was air blown and formed into a web of 30 g/m² through carding. The web was stacked by overlapping 10-fold on a conveyor belt operated at 5 m/min using a horizontal wrapper. A first aramid nonwoven fabric having a density of 300 g/m² and a thickness of 6 mm was prepared by continuously performing up-down needling, down-up needling and up-down needling with a needle stroke of 150 times/m².

2) Preparation of Inner Sound Absorbing and Insulating Layer

The prepared first nonwoven fabric was immersed in a binder solution with 1 dip 1 nip (pick-up 300%). The binder solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate.

The nonwoven fabric was taken out from the binder solution, compressed at a pressure of 8 kgf/cm² using a roller and then dried by passing through drying ovens at a temperature of 100° C., 120° C. and 150° C. at a speed of 5 m/min. The dried nonwoven fabric, i.e. an inner sound absorbing and insulating layer, contained 50 parts by weight of a binder based on 100 parts by weight of the nonwoven fabric.

3) Preparation of Second Aramid Nonwoven Fabric

A meta-aramid short fiber having a limiting oxygen index (LOI) of 40%, a heat resistance temperature of 300° C., a fineness of 2 denier and a length of 51 mm was air blown and formed into a web of 30 g/m² through carding. The web was stacked by overlapping 10-fold on a conveyor belt operated at 5 m/min using a horizontal wrapper. A second aramid nonwoven fabric having a density of 120 g/m² and a thickness of 2 mm was prepared by continuously performing up-down needling, down-up needling and up-down needling with a needle stroke of 150 times/m².

4) Preparation of Sound Absorbing and Insulating Material in which Outer Sound Absorbing and Insulating Layers are Stacked on Both Sides Two felts were prepared by gravure-treating one side of the second nonwoven fabric prepared in 3) with an adhesive solution and then drying at a temperature of 50° C. The adhesive solution contained 16 wt % of bisphenol A diglycidyl ether, 4 wt % of bisphenol A diglycidyl ether polymer, 0.2 wt % of dicyandiamide, 0.02 wt % of dimethylurea and 79.78 wt % of dimethyl carbonate.

The prepared two felts were stacked on both sides of the inner sound absorbing and insulating layer prepared in 2) such that the side where the adhesive had been coated were contacted with the inner sound absorbing and insulating layer. The prepared sound absorbing and insulating material was molded into a desired shape by curing at a temperature of 200° C. for 2 minutes.

Comparative Example 1. Preparation of Sound Absorbing and Insulating Material Formed of Aramid Nonwoven Fabric An aramid nonwoven fabric having a density of 300 g/m² and a thickness of 6 mm was prepared by needle punching as described in Example 1 for use as a sound absorbing and insulating material.

Comparative Example 2. Preparation of Sound Absorbing and Insulating Material Formed of Epoxy Resin-Coated Aramid Nonwoven Fabric An aramid nonwoven fabric having a density of 300 g/m² and a thickness of 6 mm was prepared by needle punching as described in Example 1. Subsequently, a coating solution containing an epoxy resin was coated on the surface of the nonwoven fabric so that the content of a binder was 50 parts by weight based on 100 parts by weight of the nonwoven fabric. Then, the nonwoven fabric was molded after drying at a temperature of 150° C.

The coating solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate.

Comparative Example 3. Preparation of Sound Absorbing and Insulating Material Formed of Thermoplastic Resin-Impregnated Aramid Nonwoven Fabric An aramid nonwoven fabric having a density of 300 g/m² and a thickness of 6 mm was prepared by needle punching as described in Example 1. The nonwoven fabric was immersed in a binder solution, dried and then molded.

The binder solution was a thermoplastic resin solution containing 10 wt % of polyethylene resin, 10 wt % of melamine cyanurate and 80 wt % of dimethyl carbonate (DMC).

Comparative Example 4. Preparation of Sound Absorbing and Insulating Material Formed of Epoxy Resin-Impregnated PET Nonwoven Fabric A polyethylene terephthalate (PET) nonwoven fabric having a density of 300 g/m² and a thickness of 6 mm was prepared by needle punching as described in Example 1. The nonwoven fabric was immersed in a binder solution, dried and then molded.

The PET nonwoven fabric prepared in Comparative Example 4 was thermally deformed due to the reaction heat produced during the curing of epoxy and could not be molded into a desired shape because it was completely thermally deformed during the drying and thermal molding processes.

Test Example

Evaluation of Physical Properties of Sound Absorbing and Insulating Materials The physical properties of the sound absorbing and insulating materials were measured and compared as follows.

1. Evaluation of Heat Resistance

To evaluate heat resistance, the sound absorbing and insulating material was aged in an oven at a temperature of 260° C. for 300 hours. After keeping at standard state (temperature 23±2° C., 50±5% relative humidity) for at least 1 hour, appearance was inspected and tensile strength was measured. It was visually inspected whether there were shrinkage or deformation, surface peeling, fluffing and cracking. The tensile strength was measured using a dumbbell-type No. 1 for randomly selected five sheets of test samples at a speed of 200 mm/min under a standard condition.

2. Evaluation of Thermal Cycle

The durability of the sound absorbing and insulating material was evaluated by the thermal cycle test method. The durability was determined after performing five cycles under the following conditions.

1) Condition of One Cycle

Room temperature→high temperature (150° C.×3 hr)→room temperature→low temperature (−30° C.×3 hr)→room temperature→humid condition (50° C.×95% RH).

2) Durability Evaluation Standard

After the thermal cycle test, the change in appearance was inspected. For example, surface damage, swelling, breaking and discoloring were inspected. If there was no change in appearance, the sound absorbing and insulating material was evaluated as 'no abnormality'.

3. Evaluation of Flame Retardancy

The flame retardancy of the sound absorbing and insulating material was measured according to the ISO 3795 flammability test method.

4. Evaluation of Nonflammability

The nonflammability of the sound absorbing and insulating material was measured according to the UL94 vertical burn test.

5. Evaluation of Sound-Absorbing Property

The sound-absorbing property of the sound absorbing and insulating material was measured according to the ISO 354 method.

6. Evaluation of Air Permeability

1) Evaluation Method

The test sample was mounted on a Frazier-type tester and the amount of air flowing through the sample vertically was measured. The area of the test sample through which the air passed was 5 cm$^2$ and the applied pressure was set to 125 pascal (Pa).

Test Example 1. Comparison of Properties of Sound Absorbing and Insulating Materials Depending on Heat-Resistant Fibers In Test Example 1, the physical properties of sound absorbing and insulating materials prepared with different heat-resistant fiber yarns were compared. Inner sound absorbing and insulating layer were formed by preparing first nonwoven fabrics having a density of 300 g/m$^2$ and a thickness of 6 mm by a needle punching process as described in Example 1, immersing them in a binder solution, drying them and then molding. The nonwoven fabrics were prepared using yarns having a fineness of 2 denier and a length of 51 mm, which are described in Table 1.

As outer sound absorbing and insulating layers, second nonwoven fabrics having a density 120 of g/m$^2$ and a thickness of 2 mm prepared by a needle punching process as in Example 1 were used. Sound absorbing and insulating material were prepared by stacking the outer sound absorbing and insulating layers on both sides of the inner sound absorbing and insulating layer as described in Example 1.

The physical properties of the prepared sound absorbing and insulating materials were measured as described above. The result of measuring the properties of the sound absorbing and insulating materials prepared with different heat-resistant fibers is shown in Table 1 and Table 2.

TABLE 1

Physical properties of sound absorbing and insulating materials

| | | Yarn 1 | Yarn 2 | Yarn 3 | Yarn 4 | Yarn 5 | Yarn 6 | Yarn 7 |
|---|---|---|---|---|---|---|---|---|
| Yarn | Yarn material | aramid | PPS | PI | PBI | PBO | oxi-PAN | PK |
| | Limiting oxygen index | 40 | 30 | 50 | 40 | 60 | 65 | 30 |
| | Heat resistance temperature (° C. × 1 hr) | 300 | 230 | 300 | 300 | 300 | 300 | 300 |
| Heat resistance | Appearance | No abnormality | No abnormality | No abnormality | No abnormality | No abnormality | No abnormality | No abnormality |
| | Tensile strength (Kgf/cm$^2$) | 200 | 180 | 220 | 200 | 210 | 210 | 200 |
| Thermal cycle | Appearance | No abnormality | No abnormality | No abnormality | No abnormality | No abnormality | No abnormality | No abnormality |
| Flame retardancy | | Self-extinguishing | Self-extinguishing | Self-extinguishing | Self-extinguishing | Self-extinguishing | Self-extinguishing | Self-extinguishing |
| Nonflammability | | Non-flammable | Non-flammable | Non-flammable | Non-flammable | Non-flammable | Non-flammable | Non-flammable |

TABLE 2

| | Sound-absorbing rate of sound absorbing and insulating materials | | | |
|---|---|---|---|---|
| Frequency (Hz) | Yarn 1 (aramid) | Yarn 2 (PPS) | Yarn 6 (oxi-PAN) | Yarn 7 (PK) |
| 400 | 0.08 | 0.05 | 0.08 | 0.05 |
| 500 | 0.10 | 0.06 | 0.09 | 0.06 |
| 630 | 0.16 | 0.09 | 0.13 | 0.08 |
| 800 | 0.23 | 0.15 | 0.22 | 0.19 |
| 1000 | 0.35 | 0.30 | 0.35 | 0.26 |

TABLE 2-continued

| Frequency (Hz) | Sound-absorbing rate of sound absorbing and insulating materials | | | |
|---|---|---|---|---|
| | Yarn 1 (aramid) | Yarn 2 (PPS) | Yarn 6 (oxi-PAN) | Yarn 7 (PK) |
| 1250 | 0.44 | 0.39 | 0.45 | 0.37 |
| 1600 | 0.59 | 0.49 | 0.57 | 0.31 |
| 2000 | 0.70 | 0.66 | 0.68 | 0.48 |
| 2500 | 0.79 | 0.71 | 0.80 | 0.67 |
| 3150 | 0.83 | 0.80 | 0.85 | 0.78 |
| 4000 | 0.86 | 0.83 | 0.88 | 0.84 |
| 5000 | 0.99 | 0.95 | 0.92 | 0.83 |
| 6300 | 0.98 | 0.96 | 0.98 | 0.89 |
| 8000 | 0.99 | 0.95 | 0.89 | 0.95 |
| 10000 | 0.98 | 0.97 | 0.99 | 0.95 |

As seen from Table 1 and Table 2, all the sound absorbing and insulating materials prepared using heat-resistant fibers having a limiting oxygen index of 25% or greater and a heat resistance temperature of 150° C. or greater as presented by the present invention exhibited satisfactory heat resistance, durability, flame retardancy, nonflammability and sound-absorbing property. Accordingly, it was confirmed that common heat-resistant fibers known as super fiber can be used as the material of the nonwoven fabric of the sound absorbing and insulating material according to the present invention.

Test Example 2. Comparison of Properties of Sound Absorbing and Insulating Materials Depending on Density of Nonwoven Fabric In Test Example 2, sound absorbing and insulating materials were prepared in the same manner as in Example 1 using first nonwoven fabrics having different densities. The sound-absorbing performance of the prepared sound absorbing and insulating materials is shown in FIG. 5.

Figure 5:
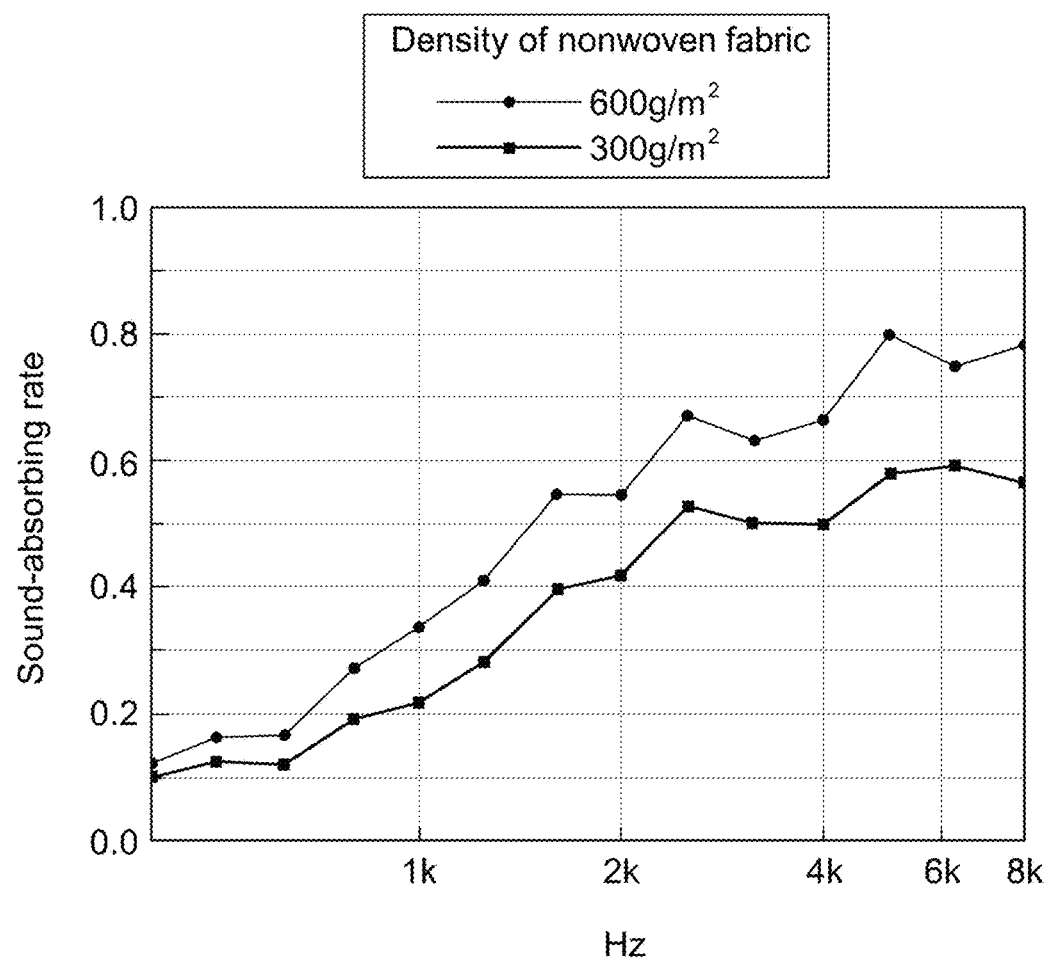
FIG. 5 is a graph comparing the sound-absorbing performance of a sound absorbing and insulating material depending on the density of a nonwoven fabric.

As seen from FIG. 5, the sound-absorbing performance of the sound absorbing and insulating material was superior when a first nonwoven fabric having a density of 600 g/m$^2$ was used than when a first nonwoven fabric having a density of 300 g/m$^2$ was used.

Test Example 3. Evaluation of Physical Properties of Sound Absorbing and Insulating Materials In Test Example 3, the properties of sound absorbing and insulating materials depending on the method by which a thermosetting binder was applied to a nonwoven fabric formed of a heat-resistant fiber were compared.

That is to say, the sound-absorbing rate of the sound absorbing and insulating material prepared by forming an inner sound absorbing and insulating layer by impregnating the thermosetting binder into the first nonwoven fabric (Example 1), the sound absorbing and insulating material formed of the first nonwoven fabric (Comparative Example 1) and the sound absorbing and insulating material prepared by coating the thermosetting binder on the first nonwoven fabric (Comparative Example 2) was compared. The result of measuring the sound-absorbing rate of the sound absorbing and insulating material formed of the sound absorbing and insulating material formed of the nonwoven fabric (Comparative Example 1), the sound absorbing and insulating material prepared by coating the thermosetting binder on the surface of the nonwoven fabric (Comparative Example 2) and the sound absorbing and insulating material prepared using the inner sound absorbing and insulating layer wherein the thermosetting binder is impregnated into the nonwoven fabric (Example 1) is shown in Table 3.

TABLE 3

| Frequency (Hz) | Sound-absorbing rate | | |
|---|---|---|---|
| | Comparative Example 1 | Comparative Example 2 | Example 1 |
| 400 | 0.01 | 0.02 | 0.08 |
| 500 | 0.03 | 0.03 | 0.10 |
| 630 | 0.12 | 0.05 | 0.17 |
| 800 | 0.16 | 0.08 | 0.24 |
| 1000 | 0.26 | 0.12 | 0.35 |
| 1250 | 0.32 | 0.15 | 0.46 |
| 1600 | 0.39 | 0.22 | 0.59 |
| 2000 | 0.48 | 0.29 | 0.72 |
| 2500 | 0.64 | 0.40 | 0.79 |
| 3150 | 0.63 | 0.57 | 0.83 |
| 4000 | 0.72 | 0.68 | 0.86 |
| 5000 | 0.80 | 0.77 | 0.98 |
| 6300 | 0.78 | 0.82 | 0.99 |
| 8000 | 0.89 | 0.98 | 0.99 |
| 10000 | 0.90 | 0.98 | 0.98 |

As seen from Table 3, the sound absorbing and insulating material according to the present invention showed superior sound-absorbing rate in all frequency ranges as compared to Comparative Example 1 wherein the nonwoven fabric not impregnated with the thermosetting binder was used as the nonwoven fabric. In contrast, the sound absorbing and insulating material of Comparative Example 2 wherein the nonwoven fabric on which the thermosetting binder was coated was used showed lower sound-absorbing rate than the nonwoven fabric (Comparative Example 1) in the frequency range of 400-5000 Hz.

Test Example 4. Evaluation of Heat-Insulating Performance of Sound Absorbing and Insulating Materials In Test Example 4, the heat-insulating performance of the sound absorbing and insulating materials prepared in Example 1, Comparative Example 1 and Comparative Example 3 was evaluated. After applying heat of 1000° C. from one side of a 25-mm thick sample of each sound absorbing and insulating material for 5 minutes, temperature was measured on the opposite side of the sample.

The temperature measured on the opposite side of the sound absorbing and insulating material was 250° C. for the surface layer of Example 1 and 350° C. for the sound absorbing and insulating material of Comparative Example 1. Accordingly, it was confirmed that the sound absorbing and insulating material of the present invention wherein the thermosetting resin was impregnated exhibits improved heat-insulating performance. In contrast, the thermoplastic resin-impregnated sound absorbing and insulating material of Comparative Example 3 melted down and deformed as soon as the heat a temperature of 1000° C. was applied.

Accordingly, it can be seen that the sound absorbing and insulating material of the present invention has very superior heat-insulating property.

Test Example 5. Comparison of Heat-Insulating Performance with Aluminum Heat-Insulating Plate In Test Example 5, the heat-insulating performance of the sound absorbing and insulating material of Example 1 was compared with that of an aluminum heat-insulating plate. While applying the same heat from one side of the sound absorbing and insulating material and the heat-insulating plate at a temperature of 250° C., the temperature at the opposite side was measured with time. The result is shown in FIG. 6.

Figure 6:
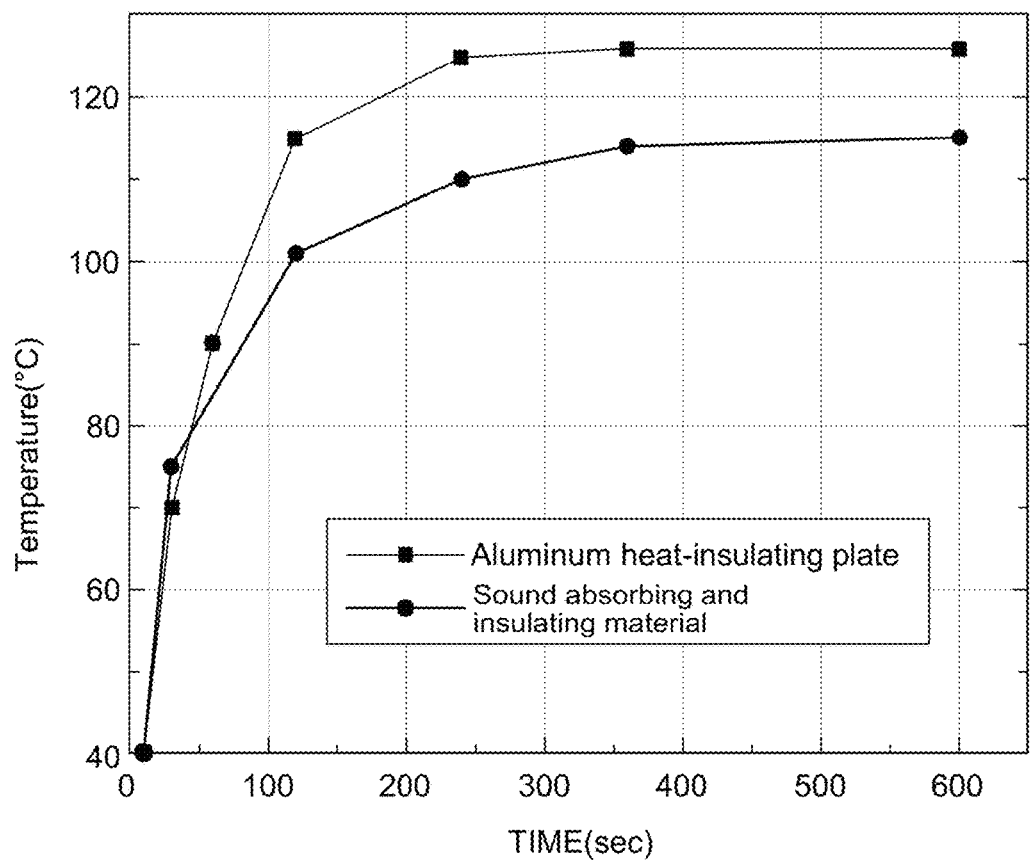
FIG. 6 is a graph comparing the heat-insulating performance of an aluminum heat-insulating plate with that of a sound absorbing and insulating material of the present invention.

As seen from FIG. 6, the sound absorbing and insulating material according to the present invention showed better heat-insulating performance with the heat resistance temperature at least 11° C. lower as compared to the aluminum heat-insulating plate.

Test Example 6. Comparison of Properties of Sound Absorbing and Insulating Material Depending on Binder Content Sound absorbing and insulating materials were prepared in the same manner as in Example 1. The epoxy resin-impregnated first aramid nonwoven fabric was dried to have different final binder contents. The binder content was represented as parts by weight of the binder included in the sound absorbing and insulating material based on 100 parts by weight of the dried nonwoven fabric.

The result of comparing the mechanical properties and sound-absorbing rate of the sound absorbing and insulating materials prepared with different binder contents is shown in Table 4 and Table 5.

TABLE 4

| Binder content (parts by weight) | Mechanical properties of sound absorbing and surface layers with different binder contents | | | | |
|---|---|---|---|---|---|
| | 0 | 10 | 50 | 100 | 200 |
| Air permeability (mL/cm² · s) | 500 | 380 | 350 | 320 | 210 |
| Tensile strength (kg/cm²) | 40 | 60 | 200 | 240 | 310 |
| Nonflammability | Nonflammable | Nonflammable | Nonflammable | Nonflammable | Nonflammable |

TABLE 5

| | Sound-absorbing rate of surface layers with different binder contents | | | | |
|---|---|---|---|---|---|
| Frequency (Hz) | 0 parts by weight | 10 parts by weight | 50 parts by weight | 100 parts by weight | 200 parts by weight |
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.23 | 0.25 | 0.11 |
| 1000 | 0.26 | 0.26 | 0.35 | 0.30 | 0.14 |
| 1250 | 0.32 | 0.34 | 0.44 | 0.42 | 0.17 |
| 1600 | 0.39 | 0.41 | 0.59 | 0.54 | 0.22 |
| 2000 | 0.48 | 0.55 | 0.70 | 0.58 | 0.35 |
| 2500 | 0.64 | 0.68 | 0.79 | 0.67 | 0.44 |
| 3150 | 0.63 | 0.69 | 0.83 | 0.72 | 0.52 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.90 | 0.70 |
| 10000 | 0.90 | 0.92 | 0.98 | 0.92 | 0.71 |

As seen from Table 4 and Table 5, the sound-absorbing rate was improved as the binder was impregnated into the nonwoven fabric when compared with the nonwoven fabric not impregnated with the binder. Also, it was confirmed that the sound-absorbing rate of the sound absorbing and insulating material could be controlled with the binder content.

Test Example 7. Comparison of Properties of Sound Absorbing and Insulating Material Depending on Binders Sound absorbing and insulating materials wherein 50 parts by weight of a binder was impregnated based on 100 parts by weight of a first aramid nonwoven fabric were prepared in the same manner as in Example 1. The resins described in Table 6 were used as the binder.

The result of comparing the mechanical properties and sound-absorbing rate of the sound absorbing and insulating materials prepared with different binders is shown in Table 6.

TABLE 6

| | Physical properties of sound absorbing and insulating materials with different binders | | | | |
|---|---|---|---|---|---|
| Binder resin | Epoxy | Phenol | Urea | Melamine | Polyurethane |
| Heat resistance temperature (° C. × 1 hr) | 300 | 260 | 190 | 300 | 200 |
| Tensile strength (kg/cm²) | 200 | 165 | 180 | 180 | 170 |
| Flame retardancy | Self-extinguishing | Self-extinguishing | Self-extinguishing | Self-extinguishing | Self-extinguishing |
| Nonflammability | Nonflammable | Nonflammable | Nonflammable | Nonflammable | Nonflammable |

What is claimed is:

1. A sound absorbing and insulating material comprising:
   an inner sound absorbing and insulating layer comprising a first nonwoven fabric comprising 30-100 wt % of a heat-resistant fiber and a binder present in the same layer as the first nonwoven fabric and maintaining a three-dimensional structure inside the nonwoven fabric,
   wherein the binder is uniformly distributed and attached to the surface of a fiber yarn of the nonwoven fabric and maintains or further forms micro cavities of the nonwoven fabric; and
   an outer sound absorbing and insulating layer for preventing leakage of the binder included in the inner sound absorbing and insulating layer comprising a second nonwoven fabric that does not comprise a binder and comprises 30-100 wt % of a heat-resistant fiber,
   wherein the outer sound absorbing and insulating layer is stacked on one or both sides of the inner sound absorbing and insulating layer, and a thickness of the outer sound absorbing and insulating layer is thinner than a thickness of the inner sound absorbing and insulating layer.

2. The sound absorbing and insulating material according to claim 1, wherein, the stacking between the inner sound absorbing and insulating layer and the outer sound absorbing and insulating layer is achieved by an adhesive, heat or pressure.

3. The sound absorbing and insulating material according to claim 1, wherein an adhesive is coated on one side of the outer sound absorbing and insulating layer and then the outer sound absorbing and insulating layer is stacked by contacting the adhesive-coated side with the inner sound absorbing and insulating layer.

4. The sound absorbing and insulating material according to claim 3, wherein the adhesive used for the stacking between the inner sound absorbing and insulating layer and the outer sound absorbing and insulating layer is the binder contained in the first nonwoven fabric.

5. The sound absorbing and insulating material according to claim 4, wherein the adhesive is a thermosetting resin.

6. The sound absorbing and insulating material according to claim 1, wherein the heat-resistant fiber constituting the first nonwoven fabric or the second nonwoven fabric has a limiting oxygen index (LOI) of 25% or greater and a heat resistance temperature of 150° C. or greater.

7. The sound absorbing and insulating material according to claim 6, wherein the heat-resistant fiber is one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

8. The sound absorbing and insulating material according to claim 7, wherein the heat-resistant fiber is an aramid fiber.

9. The sound absorbing and insulating material according to claim 1, wherein the first nonwoven fabric or the second nonwoven fabric is formed of an aramid fiber having a fineness of 1-15 denier and is a single-layered nonwoven fabric having a thickness of 3-20 mm.

10. The sound absorbing and insulating material according to claim 1, wherein the first nonwoven fabric or the second nonwoven fabric has a density of 100-2000 g/m$^2$.

11. The sound absorbing and insulating material according to claim 10, wherein the nonwoven fabric has a density of 200-1200 g/m$^2$.

12. The sound absorbing and insulating material according to claim 1, wherein the inner sound absorbing and insulating layer is formed of a single layer or multiple layers.

13. The sound absorbing and insulating material according to claim 1, wherein the binder included in the inner sound absorbing and insulating layer is a thermosetting resin.

14. The sound absorbing and insulating material according to claim 5, wherein the thermosetting resin is an epoxy resin.

15. The sound absorbing and insulating material according to claim 14, wherein the epoxy resin is one or more epoxy resin selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

16. The sound absorbing and insulating material according to any of claim 1, wherein the sound absorbing and insulating material is molded to have a three-dimensional shape corresponding to that to which the sound absorbing and insulating material is applied.

17. The sound absorbing and insulating material according to claim 16, wherein the sound absorbing and insulating material is for an automobile.

18. A method for manufacturing the sound absorbing and insulating material according to claim 1, comprising:

a) immersing a first nonwoven fabric comprising 30-100 wt % of a heat-resistant fiber in a binder solution;
b) forming an inner sound absorbing and insulating layer 1 by drying the first nonwoven fabric; and
c) forming an outer sound absorbing and insulating layer 2', 2" by stacking a second nonwoven fabric comprising 30-100 wt % of a heat-resistant fiber on one or both sides of the inner sound absorbing and insulating layer 1.

19. The method for manufacturing the sound absorbing and insulating material according to claim 18, wherein which further comprises, after c), d) molding the sound absorbing and insulating material at high temperature.

20. The method for manufacturing the sound absorbing and insulating material according to claim 18, wherein the drying in b) is performed at a temperature of 70-200 and the inner sound absorbing and insulating layer formed by the drying comprises 1-300 parts by weight of a binder based on 100 parts by weight of the nonwoven fabric.

21. The method for manufacturing the sound absorbing and insulating material according to claim 18, wherein the stacking in c) is achieved by an adhesive, heat or pressure.

22. The method for manufacturing the sound absorbing and insulating material according to claim 21, wherein the stacking is performed by coating an adhesive on one side of the second nonwoven fabric and then contacting the side on which the adhesive has been coated with the inner sound absorbing and insulating layer.

23. The method for manufacturing the sound absorbing and insulating material according to claim 22, wherein the adhesive is a binder included in the first nonwoven fabric.

24. The method for manufacturing the sound absorbing and insulating material according to claim 23, wherein the adhesive is a thermosetting resin.

25. The method for manufacturing the sound absorbing and insulating material according to claim 18, wherein the heat-resistant fiber constituting the first nonwoven fabric or the second nonwoven fabric has a limiting oxygen index (LOI) of 25% or greater and a heat resistance temperature of 150 degree ° C. or greater.

26. The method for manufacturing the sound absorbing and insulating material according to claim 25, wherein the heat-resistant fiber is one or more selected from a group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, basalt fiber, a silica fiber and a ceramic fiber.

27. The method for manufacturing the sound absorbing and insulating material according to claim 25, wherein the heat-resistant fiber is an aramid fiber having a fineness of 1-15 denier and a yarn length of 20-100 mm.

28. The method for manufacturing the sound absorbing and insulating material according to claim 18, wherein the first nonwoven fabric or the second nonwoven fabric has a thickness of 3-20 mm and a density of 100-2000 g/m$^2$.

29. The method for manufacturing the sound absorbing and insulating material according to claim 28, wherein the first nonwoven fabric or the second nonwoven fabric is an aramid nonwoven fabric having a thickness of 3-20 mm, formed by needle punching of a heat-resistant aramid fiber having a fineness of 1-15 denier.

30. The method for manufacturing the sound absorbing and insulating material according to claim 29, wherein the nonwoven fabric is formed by continuously performing up-down needling, down-up needling and up-down needling.

31. The method for manufacturing the sound absorbing and insulating material according to claim 29, wherein the nonwoven fabric is formed with a needle stroke of 30-350 times/m².

32. The method for manufacturing the sound absorbing and insulating material according to claim 18, wherein the binder solution comprises 1-60 wt % of a binder, 0.1-10 wt % of a curing agent, 0.01-5 wt % of a catalyst, 1-40 wt % of an additive and a solvent as the remainder.

33. The method for manufacturing the sound absorbing and insulating material according to claim 32, wherein the binder solution comprises 1-30 wt % of a binder, 0.1-10 wt % of a curing agent, 0.01-5 wt % of a catalyst, 1-30 wt % of a flame retardant and 40-95 wt % of a solvent.

34. The method for manufacturing the sound absorbing and insulating material according to claim 33, wherein the binder is a thermosetting resin.

35. The method for manufacturing the sound absorbing and insulating material according to claim 34, wherein the thermosetting resin is an epoxy resin.

36. The method for manufacturing the sound absorbing and insulating material according to claim 35, wherein the epoxy resin is one or more selected from a group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, a bisphenol A diglycidyl ether polymer, phosphazene diglycidyl ether, bisphenol A novolac epoxy, a phenol novolac epoxy resin and an o-cresol novolac epoxy resin.

37. The method for manufacturing the sound absorbing and insulating material according to claim 18, wherein the sound absorbing and insulating material is for an automobile.

38. A method for reducing noise of a noise-generating device, comprising:
   i) checking a three-dimensional shape of a noise-generating device;
   ii) preparing and molding the sound absorbing and insulating material according to claim 1 so as to correspond to the three-dimensional shape of the device partially or entirely; and
   iii) bringing the sound absorbing and insulating material adjacent to the noise-generating device.

39. The method for reducing noise of a noise-generating device according to claim 38, wherein the device is a motor, an engine or an exhaust system.

40. The method for reducing noise of a noise-generating device according to claim 39, wherein the sound absorbing and insulating material is brought adjacent to the noise-generating device by attaching the sound absorbing and insulating material to the noise-generating device, providing the sound absorbing and insulating material with a distance from the noise-generating device, or molding the sound absorbing and insulating material as a part of the noise-generating device.

* * * * *